Feb. 12, 1929. 1,702,199

F. A. CUNNINGHAM

COMBINED CONE AND BOTTLE SERVER AND FAN

Filed Jan. 28, 1926

Inventor
F. A. Cunningham
By
Attorney.

Patented Feb. 12, 1929.

1,702,199

UNITED STATES PATENT OFFICE.

FRANK A. CUNNINGHAM, OF WILLIAMSPORT, PENNSYLVANIA.

COMBINED CONE AND BOTTLE SERVER AND FAN.

Application filed January 28, 1926. Serial No. 84,357.

This invention relates to a combined cone and bottle server and a fan.

The primary object of the invention is to provide a structure which may be used at amusement or ball parks, bazaars, lawn fetes, clubs, wayside refreshment stands, drug and stationery stores, soda fountains, and the like, for serving ice cream cones and beverages in bottles, after which the person purchasing cones or drinks dispensed in a server may use the latter as a fan.

A further object of the invention is to provide an article of the above mentioned type which is of such exceedingly simple construction that it may be manufactured at a very nominal expense, whereby, it may be classed as a practical article of manufacture.

Other objects and advantages of the invention will be apparent during the course of the following description.

Figure 1:
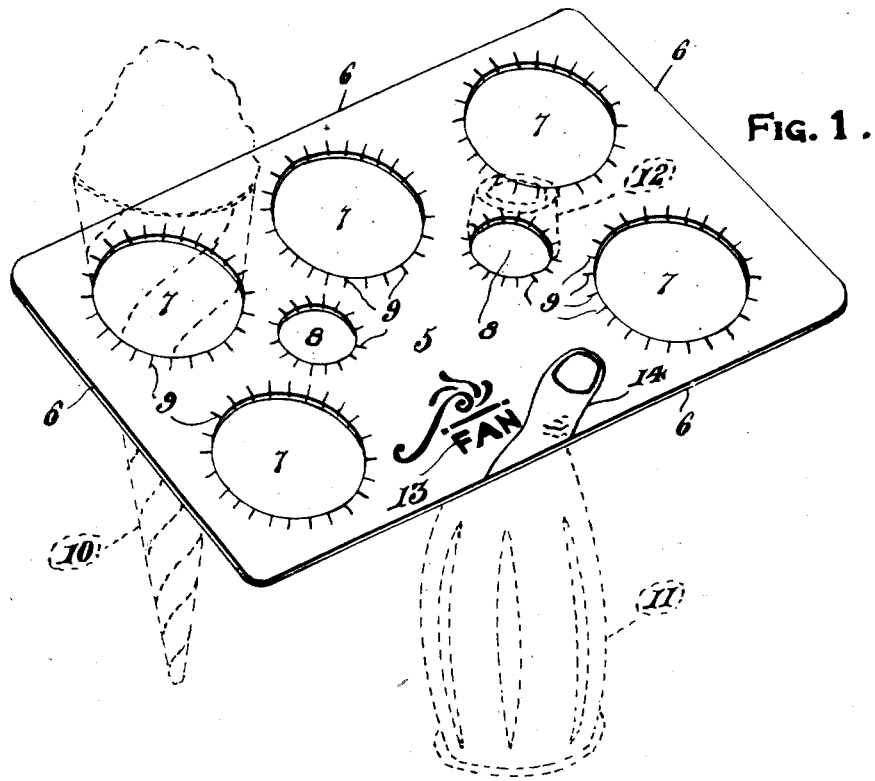
Figure 2:
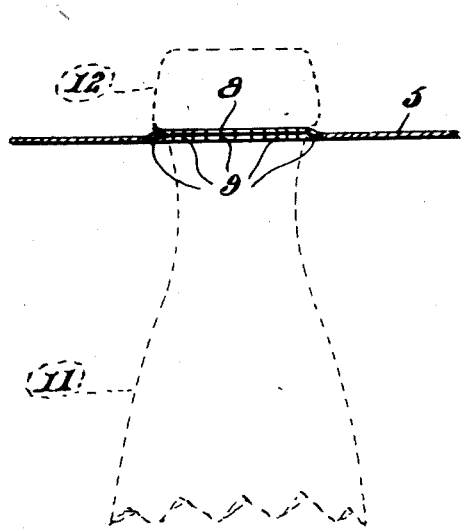
Figure 3:
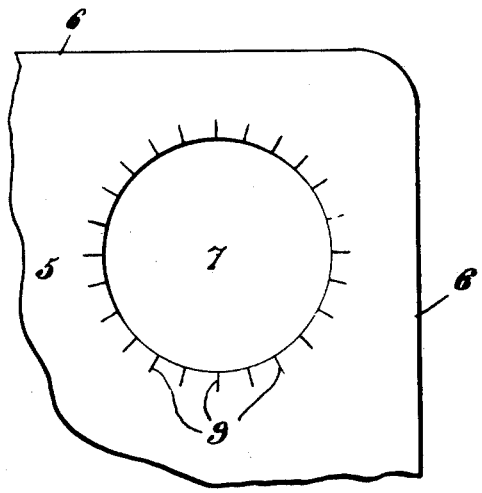

In the accompanying drawing forming a part of this specification and in which like numerals are employed to designate like parts throughout the same, Figure 1 is a perspective view of a cone and bottle server and a fan embodying this invention with an ice cream cone and a beverage bottle shown in dotted lines supported thereby, Figure 2 is a fragmentary sectional view of the server and fan and more clearly illustrates the manner in which a bottle is held by the same, and Figure 3 is a fragmentary plan view of the article.

In the drawing, wherein for the purpose of illustration is shown a preferred embodiment of this invention, the numeral 5 designates the sheet-like or card body portion of the structure which is formed of a material of sufficient strength to support a plurality of ice cream cones and beverage bottles. This body portion 5 is intended to be of square or rectangular shape in plan with its four edges 6 formed straight.

This body portion 5 has formed therein any desired number of different sized openings 7 and 8. The edges of the two different sized openings 7 and 8 are clearly illustrated as being serrated or slotted at 9 for forming expansible openings. The openings 7 are of a suitable size for receiving ice cream cones 10, in the manner best illustrated in Fig. 1. It is to be understood, although not illustrated, that the openings 7 will be of a proper size, when allowing for the increased diameter produced by the serrated or slotted edges 9, to permit the insertion of the neck of a milk bottle, say of a half pint size, therethrough. The manner in which the serrated or slotted edges of a hole 7 will grip a milk bottle neck will be described in detail at a later point.

The openings 8 in the body portion 5 are of a suitable size to permit the insertion therethrough of the neck of a soft drink or other beverage bottle 11, as best illustrated in Fig. 1. Figure 2 clearly illustrates the neck portion of a soft drink bottle 11 with the enlarged portion 12 formed thereon. It will be seen, by carefully inspecting this figure, that the diameter of an opening 8 may be increased sufficiently, due to the upward flexing or bending of the teeth or tongues formed by the serrations or splits 9, to permit the largest portion 12 of the bottle neck to be inserted upwardly therethrough. After the large portion 12 has been inserted and the weight of the bottle is placed upon the body portion 5, the teeth will remain at an upwardly inclined angle in respect to the plane of the body portion 5 for causing the same to grip and hold the bottle neck in the opening 8. It is to be understood that when a milk bottle neck is inserted through an opening 7, the same action will take place and the enlarged portion of a milk bottle neck will be gripped by the teeth formed by the serrations or slits 9 in an opening 7.

To multiply the uses to which this structure may be put, it is intended that the card-like body portion 5 be used as a fan after its usefulness as a server has ceased. To notify a purchaser of ice cream cones and beverages served in this article of the adaptation of the card-like body portion as a fan, indicia, as at 13, is printed thereon and this indicia is preferably the word "Fan." It is also intended to display on this portion of the body 5 the representation 14 of the thumb of a human hand.

It is now believed that the construction and utility of this device will be clearly understood from the above detail description. It further is to be appreciated that the form of this invention herewith shown and described is to be taken as a preferred example of the same, and that various changes in the shape, size, and arrangement of parts may be resorted to without departing from the spirit of the invention or the scope of the subjoined claim.

Having thus described the invention, I claim:—

A bottle holder and carrier consisting of a sheet of stiff material adapted to be carried in the hand and having holes therein adapted to receive the necks of bottles, said sheet having circular series of slits radiating from the holes and defining tongues flexible upwardly to permit upward passage of external beads on the bottle necks through the holes and engageable under said beads to hold the bottles suspended from said sheet.

In testimony whereof I affix my signature.

FRANK A. CUNNINGHAM.